(12) United States Patent
Brown et al.

(10) Patent No.: US 10,533,435 B2
(45) Date of Patent: Jan. 14, 2020

(54) FAN BLADE PLATFORM SPACER MOUNTING

(71) Applicant: UNITED TECHNOLOGIES CORPORATION, Farmington, CT (US)

(72) Inventors: Charles W. Brown, East Hampton, CT (US); Andrew G. Alarcon, Manchester, CT (US); Shari L. Bugaj, Haddam, CT (US); Charles R. Watson, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 615 days.

(21) Appl. No.: 15/039,880

(22) PCT Filed: Nov. 7, 2014

(86) PCT No.: PCT/US2014/064460
§ 371 (c)(1),
(2) Date: May 27, 2016

(87) PCT Pub. No.: WO2015/088680
PCT Pub. Date: Jun. 18, 2015

(65) Prior Publication Data
US 2017/0030205 A1    Feb. 2, 2017

Related U.S. Application Data

(60) Provisional application No. 61/915,645, filed on Dec. 13, 2013.

(51) Int. Cl.
*F01D 5/30*    (2006.01)
*F01D 11/00*    (2006.01)
*F01D 5/14*    (2006.01)

(52) U.S. Cl.
CPC ........... *F01D 5/3053* (2013.01); *F01D 5/143* (2013.01); *F01D 11/008* (2013.01);
(Continued)

(58) Field of Classification Search
CPC .......... F01D 5/30; F01D 5/3053; F01D 5/143; F01D 11/008
(Continued)

(56) References Cited

U.S. PATENT DOCUMENTS 3,694,104 A * 9/1972 Erwin ..................... F01D 5/147
                                                             416/215
4,232,996 A * 11/1980 Stoffer .................. F01D 5/3053
                                                             416/191
(Continued)

FOREIGN PATENT DOCUMENTS

EP    2535528    12/2012
JP    2000154702 A    6/2000

OTHER PUBLICATIONS

International Search Report and Written Opinion for PCT Application No. PCT/US2014/064460, dated Mar. 9, 2016.
(Continued)

*Primary Examiner* — Jason D Shanske
*Assistant Examiner* — Aye S Htay
(74) *Attorney, Agent, or Firm* — Carlson, Gaskey & Olds, P.C.

(57) ABSTRACT

In a featured embodiment, a fan rotor includes a platform. Clevises extend radially inwardly of the platform. Each clevis has an aperture. A hub has hub lugs positioned intermediate spaced ends of the clevises, and apertures. A pin extends through the apertures in the hub and the clevises to connect the platform to the hub. The apertures in the
(Continued)

clevises are formed to have an inner surface for supporting the pin. A method of forming a fan blade platform is also disclosed.

1 Claim, 4 Drawing Sheets

(52) U.S. Cl.
CPC ...... *F05D 2220/36* (2013.01); *F05D 2230/60* (2013.01); *F05D 2260/31* (2013.01); *F05D 2300/603* (2013.01)

(58) Field of Classification Search
USPC ............. 416/193 A, 219 R, 245 R, 248
See application file for complete search history.

(56) References Cited

U.S. PATENT DOCUMENTS

| | | | |
|---|---|---|---|
| 5,102,302 A * | 4/1992 | Schilling | B64C 11/04 416/134 A |
| 5,240,377 A * | 8/1993 | Farr | B29C 70/083 416/224 |
| 5,281,099 A | 1/1994 | Hunter et al. | |
| 5,354,176 A | 10/1994 | Schilling et al. | |
| 5,573,377 A * | 11/1996 | Bond | F01D 5/147 416/219 R |
| 6,447,250 B1 | 9/2002 | Corrigan et al. | |
| 2012/0263596 A1* | 10/2012 | Evans | F01D 5/28 416/193 A |
| 2013/0064667 A1 | 3/2013 | Campbell et al. | |
| 2014/0003958 A1* | 1/2014 | Turner | F01D 11/008 416/244 A |

OTHER PUBLICATIONS

International Preliminary Report on Patentability and Written Opinion for International Application No. PCT/US2014/064460 dated Jun. 23, 2016.

Supplementary European Search Report for European Application No. 14869817.8 dated Aug. 9, 2017.

* cited by examiner

FAN BLADE PLATFORM SPACER MOUNTING

CROSS-REFERENCE TO RELATED APPLICATION

This application claims priority to U.S. Provisional Patent Application No. 61/915,645, filed 13 Dec. 2013.

BACKGROUND OF THE INVENTION

This application relates to a fan blade platform spacer, and structure receiving a pin to pivotably attach the spacer, wherein the prior art separate bushings are eliminated.

Gas turbine engines are known, and typically include a fan delivering air into a compressor where it is compressed. The fan also delivers air into a bypass duct. Air from the compressor passes into a combustor section where it is mixed with fuel and ignited. Products of this combustion pass downstream over turbine rotors, driving them to rotate.

Historically, the fan has been driven directly by a turbine rotor. More recently, a gear reduction has been proposed between the turbine rotor and the fan rotor. With this change, the diameter of the fan blades has increased dramatically.

The fan blades may be provided with circumferentially intermediate platforms. The platforms define an airflow path in combination with the blades. The platforms have clevises extending radially inwardly. In the prior art, a pin connects lugs on the fan hub to the clevises to pivotably mount the platform. It is known to include separate metal bushings within apertures in the clevises to support the pin.

SUMMARY OF THE INVENTION

In a featured embodiment, a fan platform has clevises extending radially inwardly of the platform. Each clevis has an aperture. A hub has hub lugs positioned intermediate spaced ends of the clevises, and apertures. A pin extends through the apertures in the hub and the clevises to connect the platform to the hub. The apertures in the clevises are formed to have an inner surface for supporting the pin.

In another embodiment according to the previous embodiment, there are two clevises each receiving an intermediate hub lug.

In another embodiment according to any of the previous embodiments, the clevises are formed without the apertures, and the apertures are drilled into the clevises.

In another embodiment according to any of the previous embodiments, the apertures are molded into the clevises.

In another embodiment according to any of the previous embodiments, the apertures and the clevises receive a co-molded support structure for supporting the pin.

In another embodiment according to any of the previous embodiments, the support structure may be a friction reducing material.

In another embodiment according to any of the previous embodiments, the support structure may be one of a wrapped fabric, a woven braid, or a short fiber molding compound.

In another embodiment according to any of the previous embodiments, the support structure is a preformed composite bushing molded into the apertures.

In another embodiment according to any of the previous embodiments, a metallic surface plating is placed on the apertures.

In another embodiment according to any of the previous embodiments, the clevises are formed without the apertures, and the apertures are drilled into the clevises.

In another embodiment according to any of the previous embodiments, the apertures are molded into the clevises.

In another embodiment according to any of the previous embodiments, the apertures and the clevises receive a co-molded support structure for supporting the pin.

In another embodiment according to any of the previous embodiments, the support structure may be a friction reducing material.

In another embodiment according to any of the previous embodiments, the support structure may be one of a wrapped fabric, a woven braid, or a short fiber molding compound.

In another embodiment according to any of the previous embodiments, the support structure is a preformed composite bushing which is molded into the apertures.

In another embodiment according to any of the previous embodiments, a metallic surface plating is placed on the apertures.

In another featured embodiment, a method of forming a fan blade platform comprises the steps of forming a platform, and a plurality of clevises extending radially inwardly of the platform, with each of the plurality of clevises including an aperture. The platform and clevises are machined. The platform is attached to a hub by inserting a pin through the apertures in the clevises, and through an aperture in a hub lug. There is no separate assembly of bushings into the apertures in the clevises between machining the platform and clevises, and attaching the platform to a hub.

In another embodiment according to the previous embodiment, a support structure is molded with the clevises in the aperture.

In another embodiment according to any of the previous embodiments, the support structure is molded with the clevises and is a long tube. Portions of the tube are machined away after the molding.

In another embodiment according to any of the previous embodiments, a metal plating is formed on the tube prior to machining the platform and clevises.

These and other features of this application may be best understood from the following specification and drawings, the following which is a brief description.

DETAILED DESCRIPTION

Figure 1:
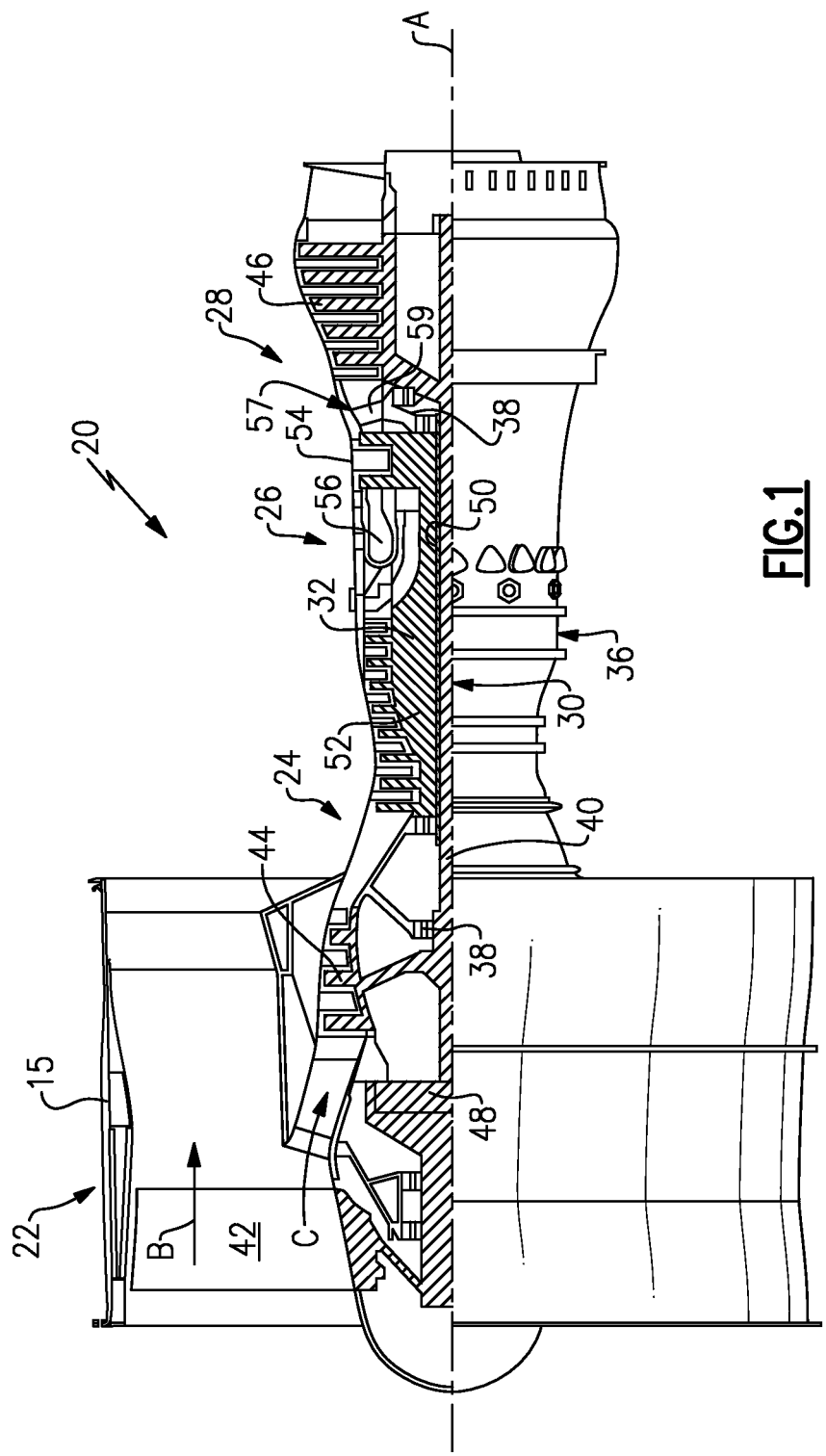
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, or other numbers of spools.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2A:
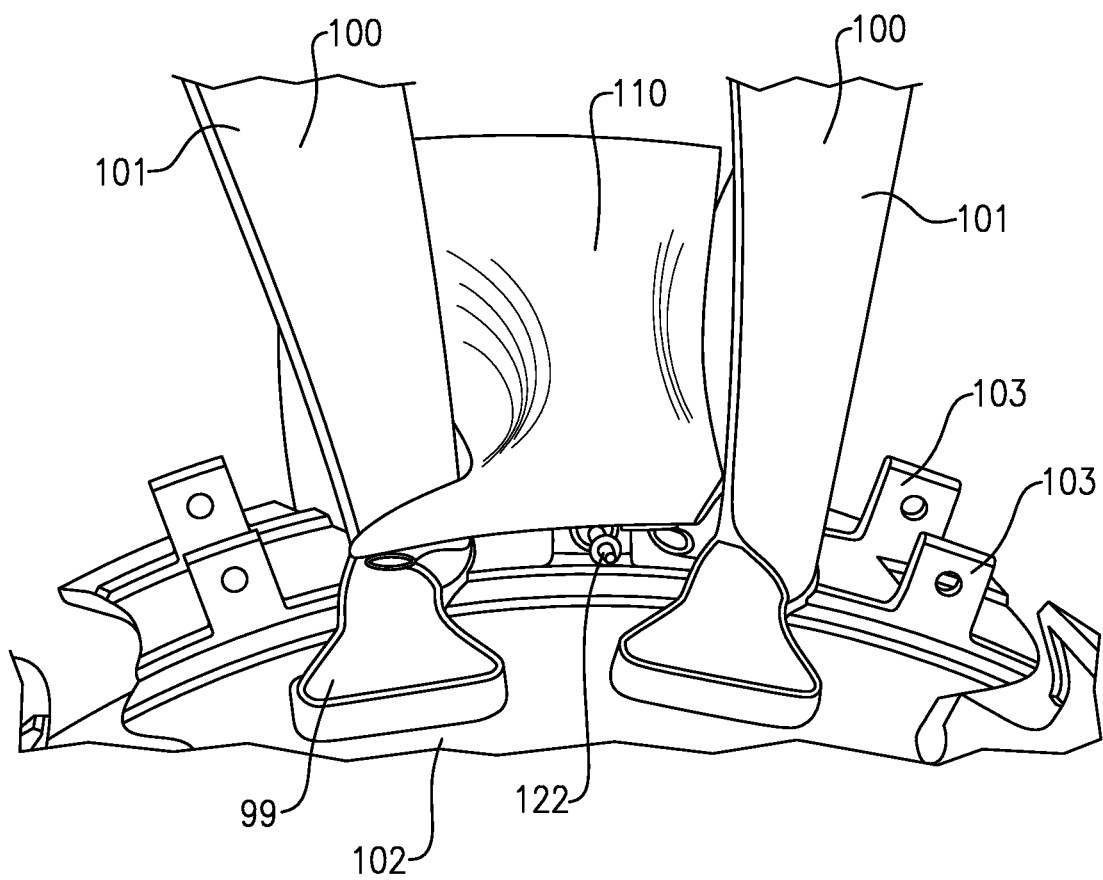
FIG. 2A shows a known fan.

FIG. 2A shows fan blades 100 having an airfoil 101, A dovetail 99 mounts the fan blade 100 in a rotor 102. This structure may be used in the FIG. 1 engine.

As shown, platforms 110 are mounted circumferentially intermediate the fan blades 100. Hub 102 is shown with lugs 103 that pivotably mount the platforms 110 such as through a pin 122. While the pin is shown as a separate part, it could also be provided as a fixed part of rotor 102.

Figure 2B:
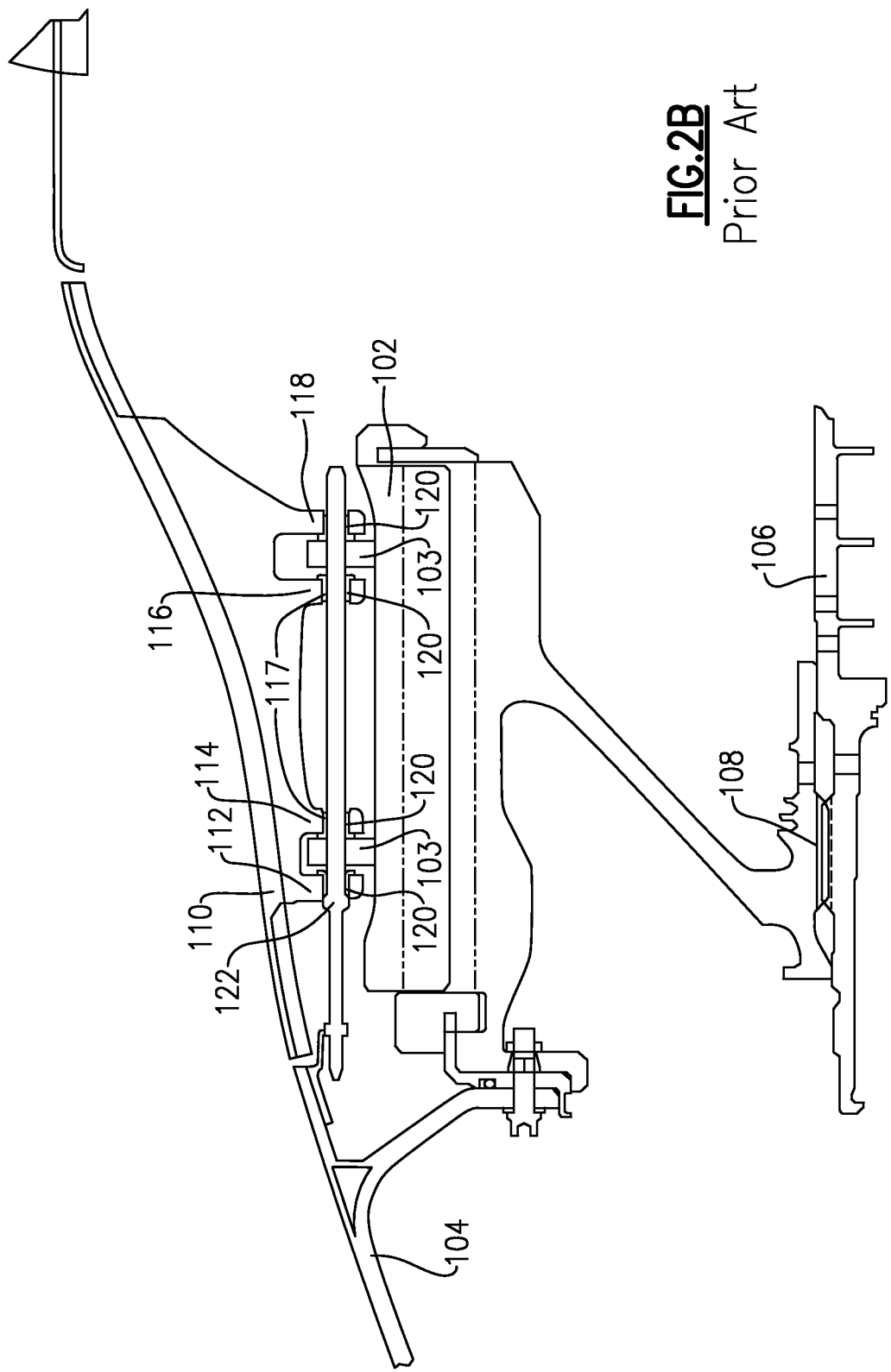
FIG. 2B shows a detail of a known fan platform mount.

The hub lugs 103 also have a hole, and receive the pin 122. As shown in FIG. 2B, the pin also passes through holes or apertures 120 in a clevis having ends 112, 114, 116 and 118 which extend radially inwardly from the platform 110. Lugs 103 are intermediate spaced clevis ends. There are two devises each receiving a hub lug between ends 112, 114, 116 and 118 of the devises. The hub 102 is threadably attached to an input drive shaft 106, and to cone structure 104. In the prior art, metal bushings 117 were separately inserted into the holes 120 to support the pin. As is clear from FIG. 2A, and is well known in this art, dovetails 99 extend radially inwardly into the hub 102 and lugs 103 extend radially outwardly to mount the platforms.

Figure 3:
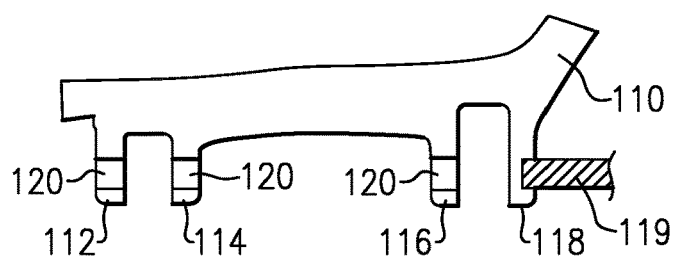
FIG. 3 shows a first embodiment.

As shown in FIG. 3, in a first embodiment platform 110, the clevis ends 112, 114, 116 and 118 are molded from an appropriate composite material. In one embodiment, the composite material may be fiber reinforced, such as by including Kevlar, fiberglass, or carbon fibers. Of course, non-composite clevis ends would also benefit from this disclosure.

The apertures 120 are not initially formed into the clevis ends 112, 114, 116 and 118. Rather, a tool such as a drill 119 drills the holes.

Figure 4:
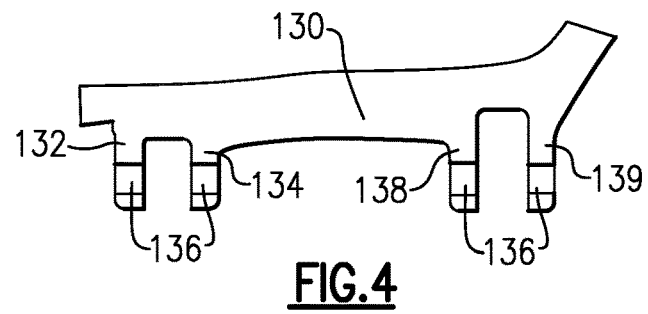
FIG. 4 shows a second embodiment.

FIG. 4 shows another embodiment 130 with clevis ends 132, 134, 138 and 139. The apertures 136 are molded into the clevises in this embodiment.

Figure 5A:
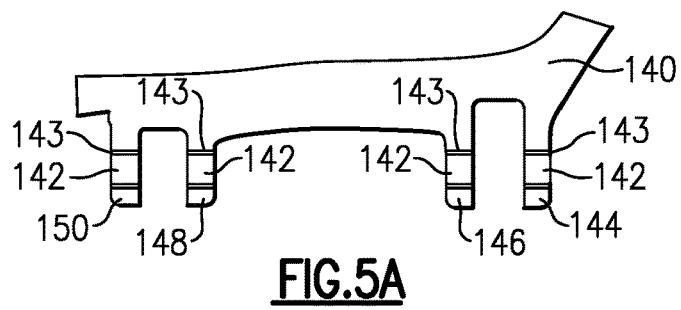
FIG. 5A shows a third embodiment.

FIG. 5A shows an embodiment 140, wherein the clevis ends 144, 146, 148 and 150 are molded to include the apertures 142. Support structure 143 is co-molded into the apertures 142. In one embodiment, the support structure 143 may be a friction reducing material, such as tetrafluoroethylene or other polymer. The support structure 143 could be in the form of wrapped fiber, woven braids, short fiber molding compound, or other appropriate materials.

Further, the supporting layer 143 could be a preformed composite bushing. This could be a thermoplastic part, or other polymer, that is molded or machined from stock, and then molded into the aperture 142.

Figure 5B:
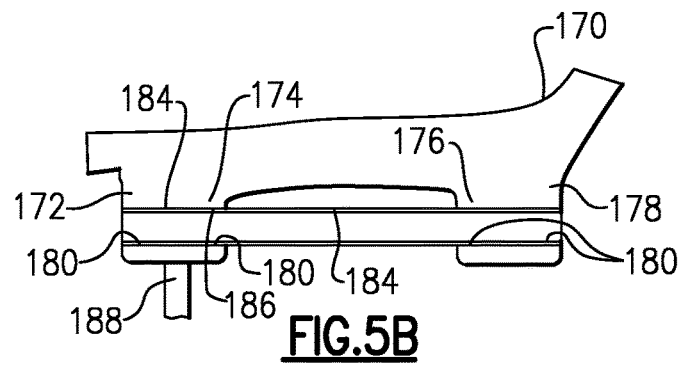
FIG. 5B shows one possible method of forming the FIG. 5A embodiment.

FIG. 5B shows another embodiment 170 where a long composite tube 186 is molded into the apertures 180 and the clevis ends 172, 174, 176, 178. Then, after the molding is complete, a tool 188 may remove portions of the tube 186 which are intermediate the clevis ends, such as the portion 184 as illustrated. Also, the intermediate space in the clevis may be machined at that time. Alternatively, the long tube may be left intact.

Figure 6:
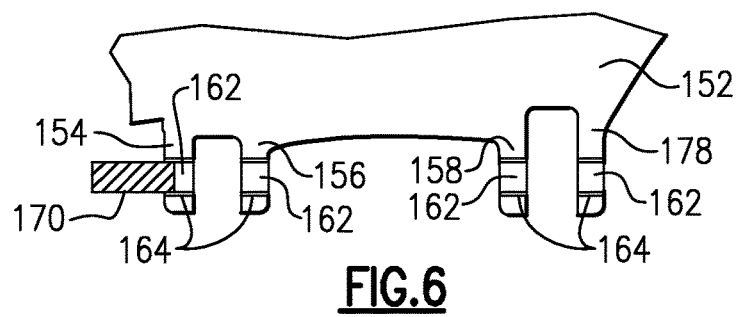
FIG. 6 shows yet another embodiment.

FIG. 6 shows yet another embodiment 152 where the clevis ends 154, 156, 158 and 178 are formed with apertures 162. Metallic plating material 164 may be plated within the apertures 162. If necessary, the plating material 164 may be reamed as shown at 170 to an appropriate size.

A method of forming a fan platform under this disclosure includes the steps of forming a platform with clevises extending radially inwardly of the platform. Each of the clevises includes an aperture. The platform and clevis are machined. The platform is attached to a hub by moving a pin through the apertures in the clevises, and through a hole or aperture in a hub lug. There is no separate, subsequent assembly of bushings into the apertures in the clevises after the forming and machining steps.

By eliminating the separate metal bushings, the weight of the fan blade is dramatically reduced. Further, surface perforation and bonding operations for the separate bushings is eliminated.

Although an embodiment has been disclosed, a worker of ordinary skill in this art would recognize that certain modifications will come within the scope of this invention. For that reason, the following claims should be studied to determine the true scope and content of this invention.

The invention claimed is:

1. A method of forming a fan blade platform comprising the steps of:
   a) forming a platform, and a plurality of clevises extending radially inwardly of said platform, with each of said plurality of clevises including an aperture;
   b) machining said platform and said plurality of clevises; and
   c) positioning a hub having radially outwardly extending hub lugs such that each of the outwardly extending hub lugs are next to corresponding ones of said plurality of clevises, and attaching said platform to said hub by moving a pin through said aperture in each of said plurality of clevises, and through an aperture in each of said hub lugs; and
   d) mounting said platform to said hub in a position adjacent to respective fan blades, wherein said fan blades include dovetails and the dovetails are attached to said hub;
   wherein a support structure is molded in said aperture in each of said plurality of clevises, and the support structure is a long tube, and portions of said long tube are machined away between adjacent ones of the plurality of clevises after molding of the support structure.

* * * * *